Aug. 17, 1926.                                             1,596,835
                    B. T. HEWSON
APPARATUS FOR TAKING, REPRODUCING, OR PROJECTING STEREOSCOPIC
                 CINEMATOGRAPH PICTURES
                    Filed May 19, 1924
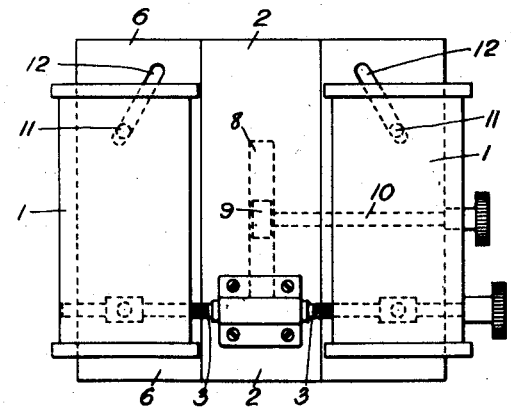
Inventor
Bertram T. Hewson
by Wilkinson & Giusta
Attorneys.

Patented Aug. 17, 1926.

1,596,835

UNITED STATES PATENT OFFICE.

BERTRAM TOM HEWSON, OF LONDON, ENGLAND.

APPARATUS FOR TAKING, REPRODUCING, OR PROJECTING STEREOSCOPIC CINEMATOGRAPH PICTURES.

Application filed May 19, 1924, Serial No. 714,433, and in Great Britain November 16, 1923.

This invention has for its object to provide improved apparatus for taking stereoscopic cinematograph pictures.

I am aware that in a camera for stereoscopic purposes it has been proposed to connect a pair of lens mountings together by a central hinge and to provide pins and angular guiding slots whereby the rear ends of the camera are caused to diverge and converge with the focussing movement and the lens mountings to turn upon their connecting hinge.

According to the present invention the camera or projector comprises the combination of a pair of lenses optically paired, tubular mountings for said lenses, a spindle having oppositely screwed ends and pivotal connections to said lens mountings at their rear ends, a base, a platform sliding backwards and forwards in said base, means for operating said platform to effect the focussing movement, pins extending downwardly from the forward end of said lens mountings, inclined guides for receiving and guiding said pins and whereby the lens mountings are automatically drawn together and moved apart by the operation of the focussing device.

With the improved apparatus I preferably employ one film bearing two pictures arranged side by side or two separate films.

The accompanying drawing illustrates a construction carried out in accordance with the present invention.

In the construction shown the relative angular adjustment of the pair of lenses in the horizontal plane necessary to produce superposition of the projected images is effected automatically with the focussing of the picture.

The mountings of the lenses 1, 1 are connected to a spindle 3 for angular adjustment at the rear end and the forward ends of the said lens mountings 1, 1 are provided with vertical pivot pins 11 adapted to slide in converging angular slots or guides 12 in fixed platform 6.

The lens mountings 1, 1 are connected to the screwed spindle 3 by pivotal pins 5 and screwed blocks 4, and the spindle 3 is mounted in a bearing 7 attached to a central sliding platform 2.

The platform 2 is operated for focussing purposes by means of rack 8, pinion 9, and spindle 10.

The focussing movement imparted to the platform 2 by the spindle 10 compels the forward ends of the lens mountings 1, 1 to converge or diverge by reason of the pins 11 sliding in the angular slots 12, and thus the superposition of the images is accurately and automatically obtained as the picture is focussed without the necessity of separate adjustment.

By projecting two pictures arranged side by side on one film or on two separate films a picture is obtained in stereoscopic relief, and if one of said pictures is tinted with one primary colour and the other with another primary colour a coloured picture in stereoscopic relief will be obtained.

What I claim as my invention and desire to secure by Letters Patent is:—

Improved apparatus for taking stereoscopic cinematograph pictures comprising the combination of a pair of lenses optically paired, tubular mountings for said lenses, a spindle having oppositely screwed ends and pivotal connections to said lens mountings at their rear ends, a base, a platform sliding backwards and forwards in said base, means for operating said platform to effect the focussing adjustment, pins extending downwardly from the forward ends of said lens mountings, inclined guides for receiving and guiding said pins and whereby the lens mountings are automatically drawn together and moved apart by the operation of the focussing device, substantially as and for the purposes set forth.

BERTRAM TOM HEWSON.